Figure 1:
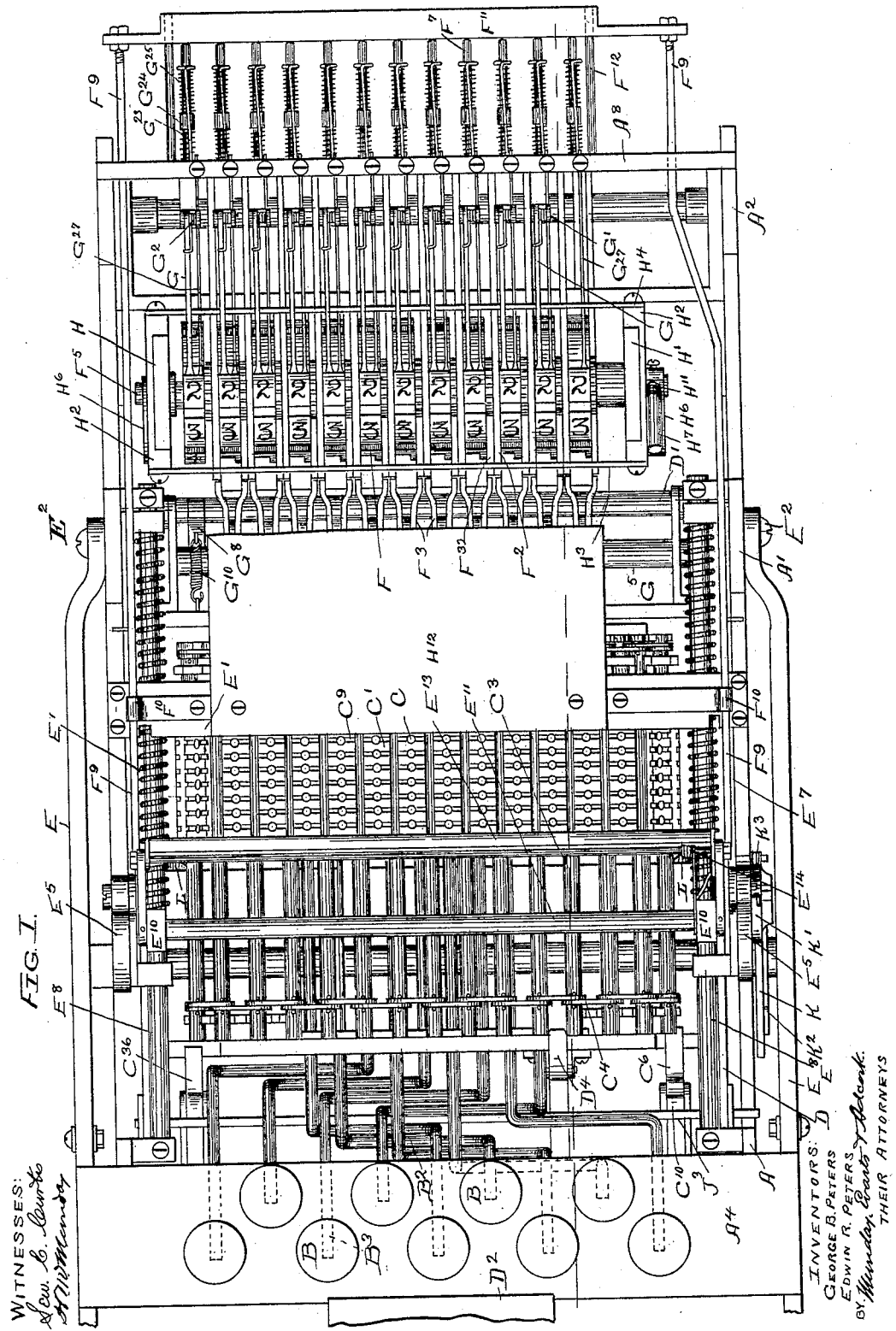

(No Model.)　　　　　　　　　　　　　　　　　　　　7 Sheets—Sheet 3.
G. B. & E. R. PETERS.
CALCULATING MACHINE.
No. 605,909.　　　　　　　　　　　　　Patented June 21, 1898.

WITNESSES:
　　　　　　　　　　　　　　　　　　　　INVENTORS:
　　　　　　　　　　　　　　　　　　　　GEORGE B. PETERS
　　　　　　　　　　　　　　　　　　　　EDWIN R. PETERS
　　　　　　　　　　　　　　　　　　BY　　　　　　　
　　　　　　　　　　　　　　　　　　　　THEIR ATTORNEYS.

(No Model.)  
7 Sheets—Sheet 5.

G. B. & E. R. PETERS.
CALCULATING MACHINE.

No. 605,909. Patented June 21, 1898.

WITNESSES:  
Lew. C. Curtis  
H. W. Munday

INVENTORS:  
George B. Peters  
Edwin R. Peters  
By Munday, Evarts & Adcock  
THEIR ATTORNEYS.

(No Model.) 7 Sheets—Sheet 6.
G. B. & E. R. PETERS.
CALCULATING MACHINE.
No. 605,909. Patented June 21, 1898.
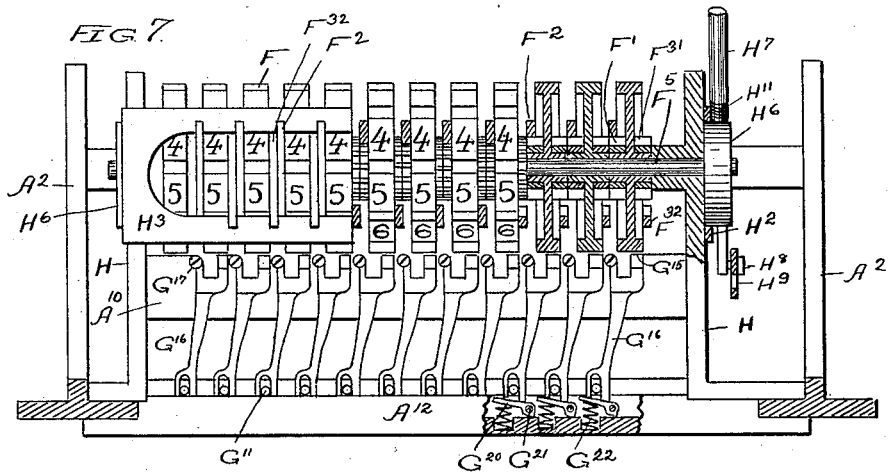
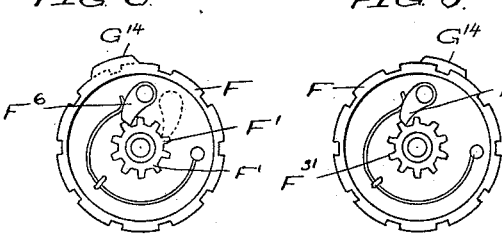
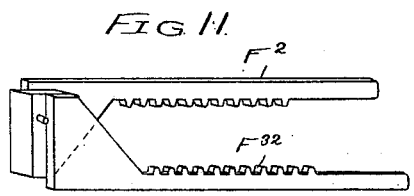
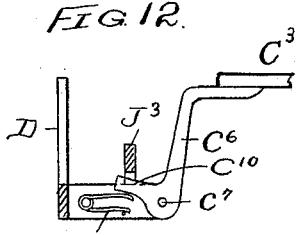
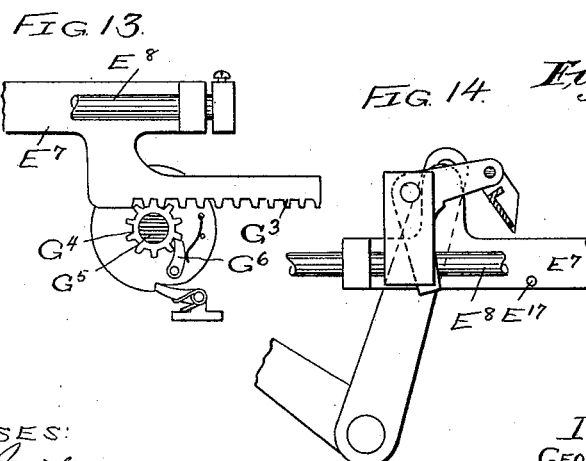
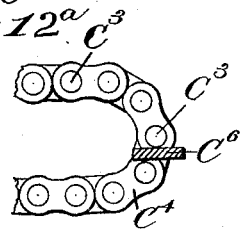
WITNESSES:
Lew. E. Curtis
H. W. Munday
INVENTORS
GEORGE B. PETERS
EDWIN R. PETERS.
BY Munday, Evarts & Adcock,
THEIR ATTORNEYS.

(No Model.) 7 Sheets—Sheet 7.
G. B. & E. R. PETERS.
CALCULATING MACHINE.
No. 605,909. Patented June 21, 1898.
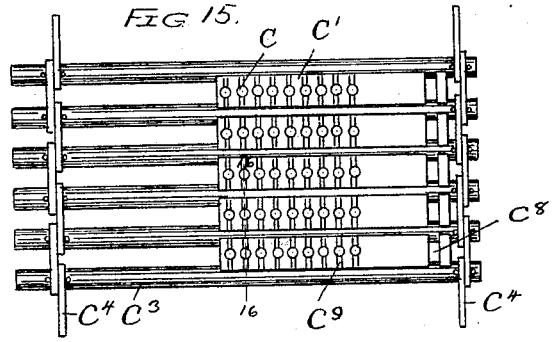
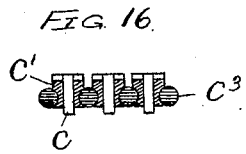
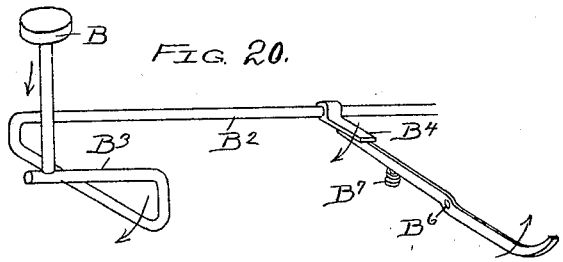
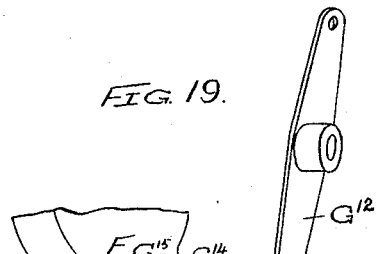
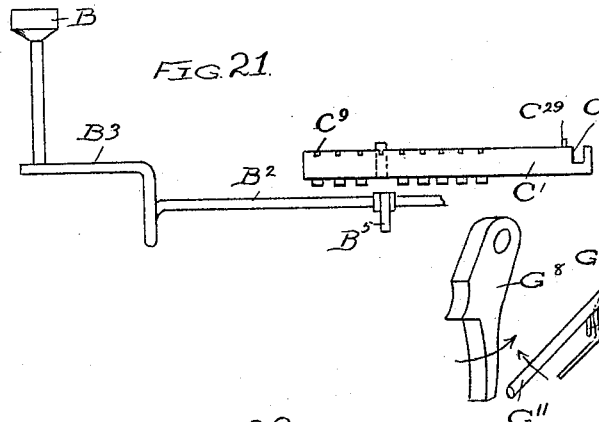
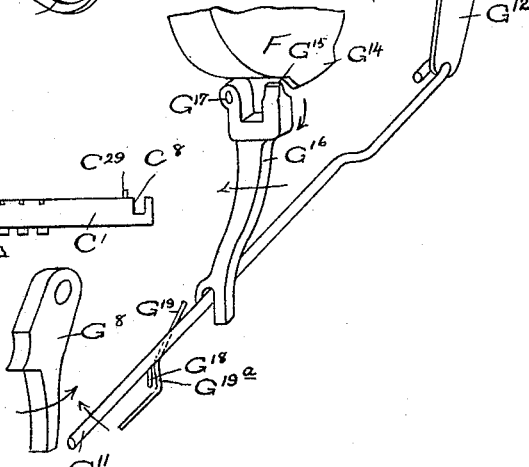
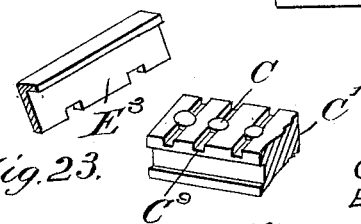
WITNESSES:
Sew. C. Curtis
H. W. Munday
INVENTORS:
GEORGE B. PETERS
EDWIN R. PETERS
BY Munday, Evarts & Adcock.
THEIR ATTORNEYS.

United States Patent Office.

GEORGE B. PETERS AND EDWIN R. PETERS, OF EMPORIA, KANSAS.

CALCULATING-MACHINE.

SPECIFICATION forming part of Letters Patent No. 605,909, dated June 21, 1898.

Application filed August 2, 1897. Serial No. 646,719. (No model.)

*To all whom it may concern:*

Be it known that we, GEORGE B. PETERS and EDWIN R. PETERS, citizens of the United States, residing in Emporia, in the county of Lyon and State of Kansas, have invented a new and useful Improvement in Calculating-Machines, of which the following is a specification.

This invention relates to machines for performing mathematical calculations involving any desired number of denominations. Its object is to provide a construction of such machines which shall be very simple, accurate in its operations, economical of manufacture, durable, and but little likely to get out of repair.

In the invention we employ only one set of keys, one for each digit, and these keys are made to answer for any number of denominations by means of certain special transferring mechanism, which forms the leading feature of the machine. In this transferring mechanism we employ at least one set of nine digital stops or pins for each denomination embraced in the machine. The supports carrying these pins are all mechanically joined together, so that all can be moved across the denominational field of the machine, and this movement is utilized to bring each set or series of pins into position over a series of levers operated by the digital keys, so the pins may be set or adjusted by said levers when said keys are struck, the purpose of this setting being to enable the pins which are set to regulate or determine the amount of rotation which shall be imparted to the numeral-wheels or registers and also to determine which of the wheels shall be operated. The movement of the pins across the denominational field is a step-by-step movement of a denominational space at each impulse and occurs at each stroke given to the keys, and it serves to carry the set pins to their proper denominational spaces, and means are also provided for giving them this movement independently of the keys. The supports by which the pins are carried (we prefer to provide a straight piece of metal for each set of the pins, in which a separate opening is made for each pin) are adapted to interlock with the mechanism which actuates the numeral-wheels, and we also give them a sliding movement longitudinally of the machine, in which they actuate said wheel mechanism. This sliding movement is caused by a hand-lever and a cross pusher-bar receiving power from the lever and moving over the pins which may be in the denominational field and encountering such of them as have been set and forcing the slides of the set pins to move with it, and thereby to give motion to the wheel-actuating devices. The pin-supports we prefer to unite together, so that they form an endless or chain series, as we thereby obviate any necessity for bringing them back to their normal or starting positions after each operation. The position of the set pins determines the extent of movement imparted to the slides and also the extent of rotation they communicate to the numeral-wheels, and only those wheels are rotated which correspond to the slides having the set pins, as the other slides are not engaged by the pusher-bar.

In the use of the machine all the figures in the numbers to be added are struck upon the keys in the natural order of the figures, reading from left to right, thereby setting one pin in each slide, and the denomination of the slides will, when all the pins have been set, correspond to the denominations of the digits included in the number, and then by a single stroke of the hand-lever all these slides are operated simultaneously, so that all actuate their respective numeral-wheels at the same time.

The invention consists not only in a mechanism for transferring the strokes of the keys to the proper numeral-wheels, but also in the novel construction of devices and parts of devices and in the novel combinations of parts and devices hereinafter fully described and set forth.

Figure 2:
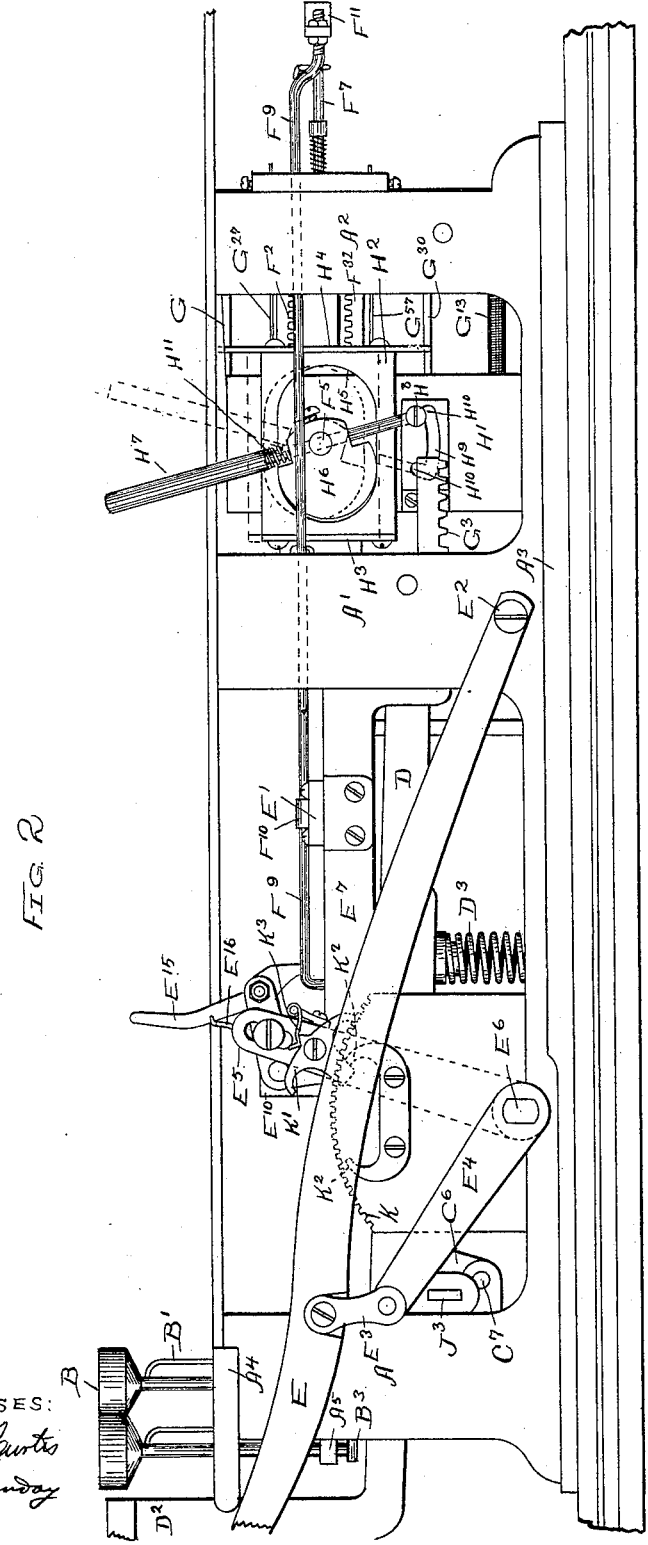
Figure 3:
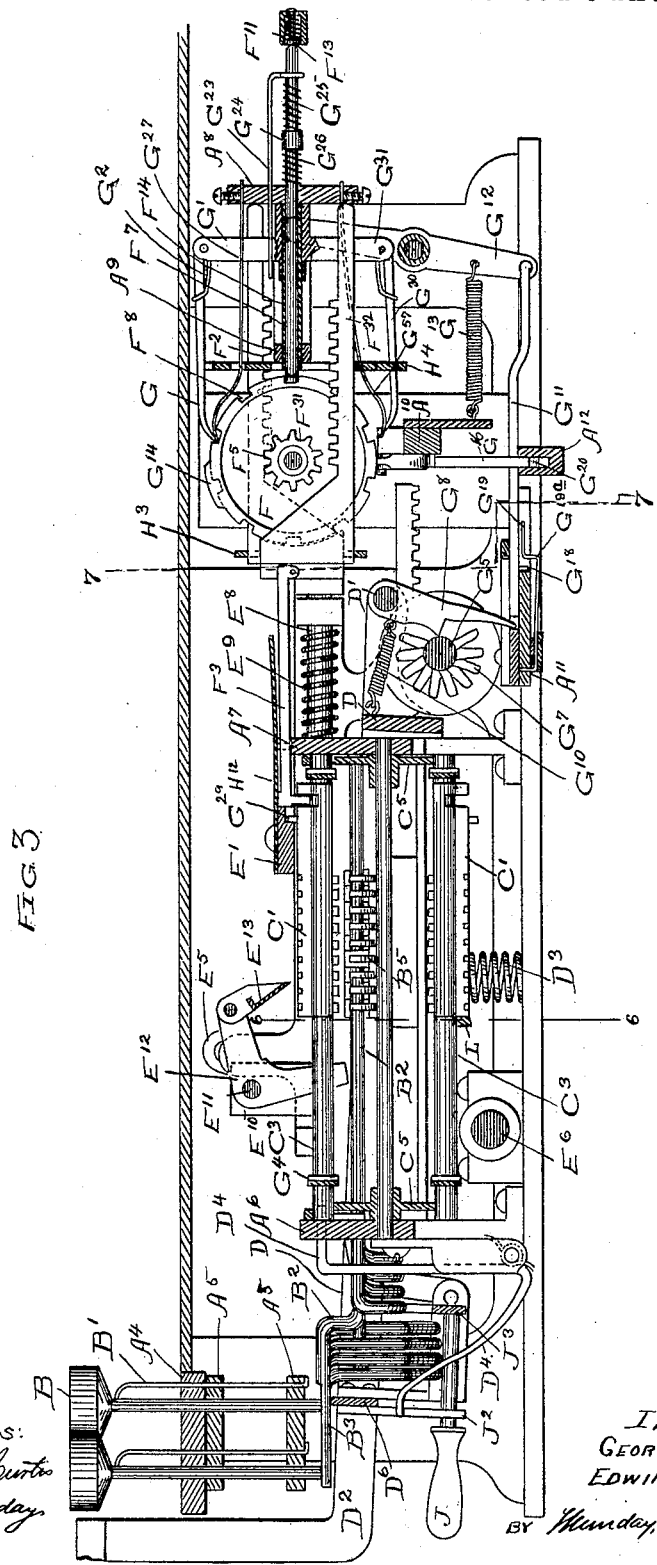
Figure 4:
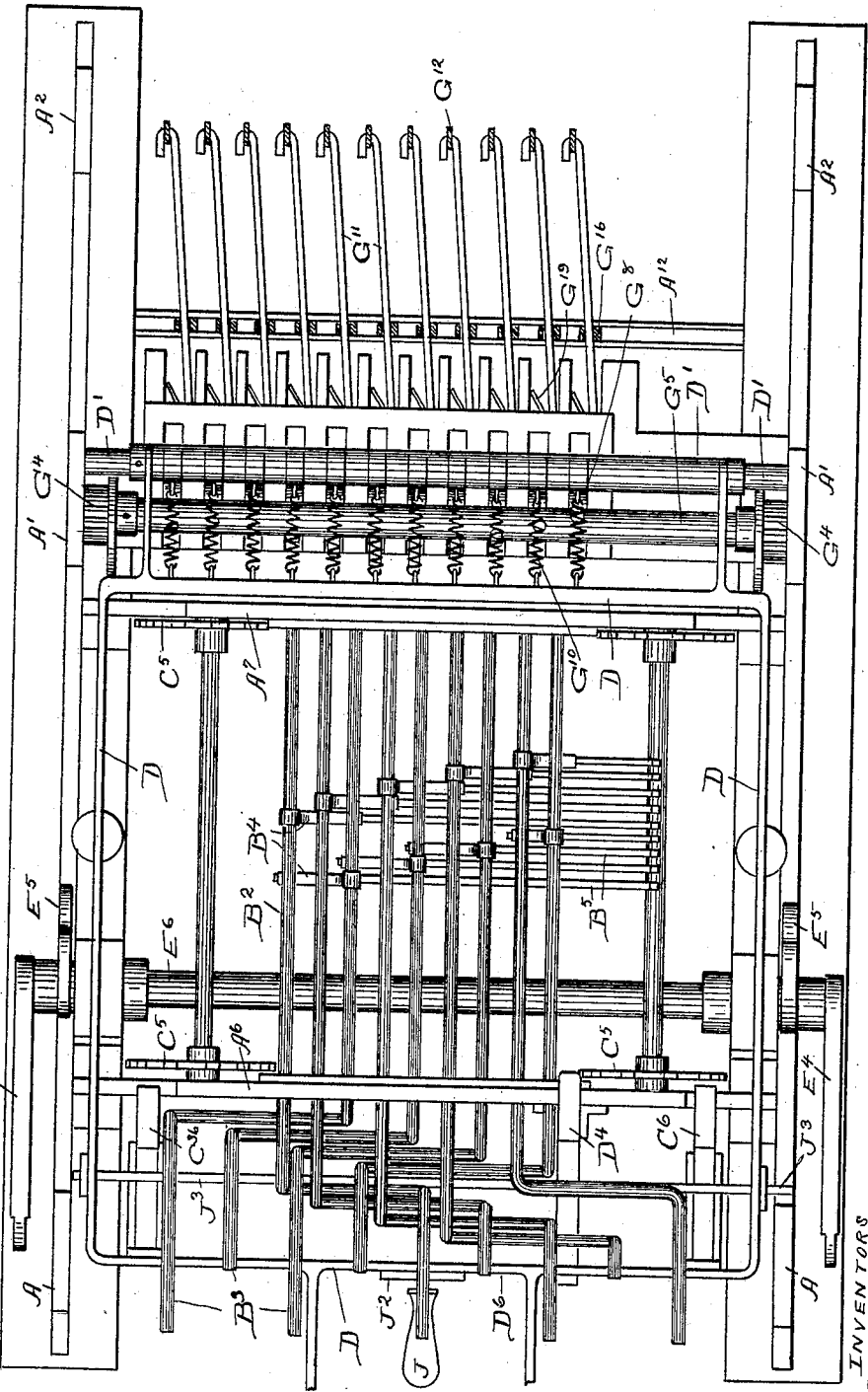
Figure 5:
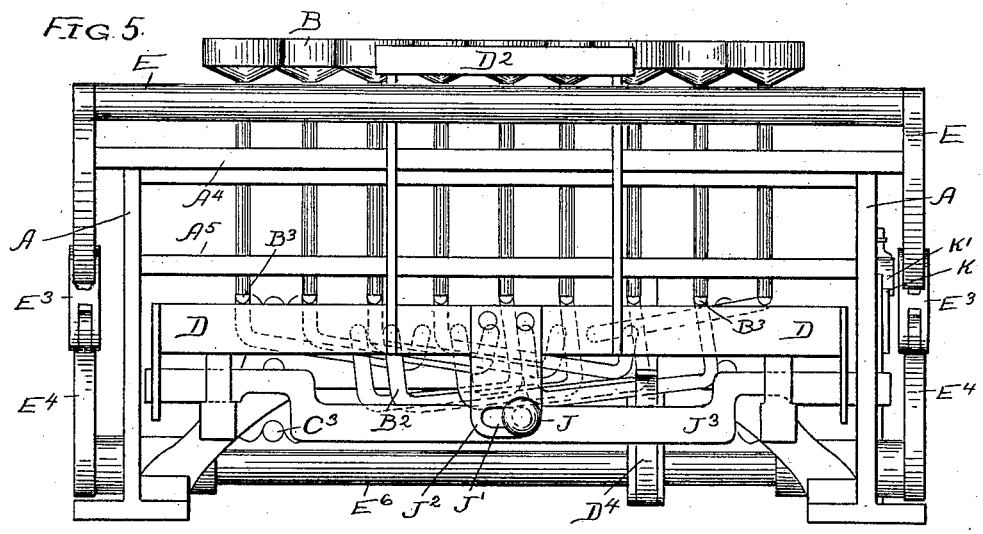
Figure 6:
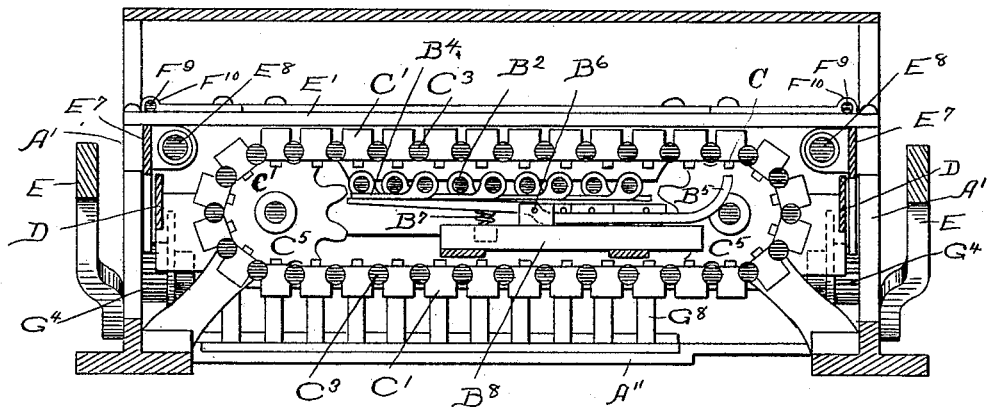

In the drawings forming a part of this specification, and in which similar letters of reference indicate like parts throughout all the views, Figure 1 is a plan of our improved calculator. Fig. 2 is a side elevation. Fig. 3 is a longitudinal vertical section. Fig. 4 is a horizontal section. Fig. 5 is a front elevation. Fig. 6 is a transverse vertical section on the line 6 6 of Fig. 3. Fig. 7 is a section on line 7 7 of Fig. 3, showing part of the numeral-wheels in section. Figs. 8 and 9 are opposite side views of the numeral-wheels.

Fig. 10 is a section of the same. Fig. 11 is a detail perspective of the rack operating the numeral-wheel. Figs. 12, 12ª, 13, and 14 are detail views. Fig. 15 is a plan of the slides and their supports. Fig. 16 is a section on line 16 16 of Fig. 15. Figs. 17 and 18 are respectively side and end views of one of the pins or stops. Fig. 19 is a diagram view illustrating the carrying mechanism. Figs. 20 and 21 are diagrams illustrating the operation of setting the stops from the keys. Fig. 22 is a detail showing the connection between the stop-carrying slides and the racks for operating the numeral-wheels. Fig. 23 is a partial perspective of the plate for depressing the pins.

In said drawings, A A, A' A', and $A^2 A^2$ represent pairs of stationary uprights at opposite sides of the machine, and $A^3 A^3$ are base-pieces to which the uprights are secured.

$A^4$ and $A^5$ are cross-pieces between uprights A A and having openings through them for the passage of the digital keys B and their guide-wires B'. The stems of the keys B are made of wire and are extended and bent variously not only to avoid interference with one another but also so as to form rock-shafts $B^2$, which are journaled in stationary vertical cross-plates $A^6$ and $A^7$, and so as to form shoulders $B^3$, adapted to bear upon and operate the frame D, through which the slide-chain is given its step-by-step movement. Each rock-shaft $B^2$ carries an arm $B^4$, which when the shaft is rocked by the depressing of its key bears upon a lever $B^5$, pivoted at $B^6$, and causes the farther end of said lever to rise and operate one of the stops or pins C, hereinafter to be described. (See Figs. 20 and 21.) A spring $B^7$ returns this lever and the key B after each operation to their normal position. The series of springs $B^7$ and pivots $B^6$ are supported upon a horizontal plate $B^8$, extending between the cross-plates $A^6$ and $A^7$. The operating points or ends of all the levers $B^5$ are arranged in a straight longitudinal line where each will come under and be in position to operate pins corresponding to it in power—that is to say, so the lever operated by the "9" key, for instance, will come under and lift the "9" pins.

The pins C are arranged in sets of nine each, corresponding to the nine digits, and each set is carried by a slide C', the latter consisting of a rectangular piece of metal having nine openings, one for each pin, arranged in a longitudinal row. The pins are also arranged in regular order from "1" to "9" and in the same order in all the slides. Each pin is grooved lengthwise to receive a light friction-spring $C^2$, whereby it is held from slipping out of its opening in the slides and is also enabled to retain its set position when moved thereto by the lever $B^5$. We prefer to pass these springs through the pins and to groove the latter upon two sides, so the springs after being passed through the pins may be bent down into the grooves, as seen at Figs. 17 and 18, as that construction avoids any possibility of losing the springs.

The slides C' are arranged in a direction longitudinal of the machine and are grooved along each side, so they may engage with and be supported by the rods $C^3$, which are linked together by links $C^4$ at their ends and form an endless chain. The rods are somewhat longer than the slides, so the latter may slide longitudinally upon them, as hereinafter set forth. Each slide occupies a column or denominational space, and the chain is moved at each stroke of the keys a distance equaling such space, so that the slides are carried from one space to the next one at each impulse. The chain is supported upon sprocket-wheels $C^5$, the teeth whereof enter between the rods $C^3$, and is actuated in the step-by-step movement by a pawl $C^6$, the point of which enters between the ends of the rods as the latter are moving vertically over the wheels at one side of the machine. This pawl receives a rising movement from the shifting frame D upon the upstroke of the latter and communicates that movement to the chain. It is pivoted to said frame at $C^7$. Its point is carried in between the rods by pressure of a spring $C^{11}$ and is shaped so as to slip off the rods easily.

All the step-by-step transverse movements of the chain and slides are caused by the U-shaped frame D, pivotally supported on a cross-rod D' and carrying the pawl $C^6$, above described. In order that the chain may be thus actuated whenever necessary—as, for instance, when a cipher occurs in the number being brought into the calculation—a front projection $D^2$ is attached to the frame, as shown, this projection being operated by hand, and in order that the chain may be actuated by the digital keys the front or cross piece $D^6$ of the frame is located immediately under the shoulders $B^3$, formed in the stem of the keys. Under each limb of the frame is a spring $D^3$, and these springs are compressed when the frame is operated and serve to impart the return or up stroke to the frame.

To prevent excess motion by the chain, as well as to lock it stationary between operations, a spring-pressed pawl $D^4$ is employed, and such pawl is located and shaped, as shown, so it will be drawn back and away from the chain by the cross-bar $D^6$, attached at its ends to the sides of the frame D, whenever the latter is actuated. The slides are also movable longitudinally along their supporting-rods, and this movement is caused by a pusher-bar E', extending from side to side of the machine and movable toward the front thereof by power from a hand U-shaped frame lever E, having its ends pivoted at $E^2$ and connected to said bar by links $E^3$, cranks $E^4$, levers $E^5$ upon the shaft $E^6$, operated by the cranks, and side slides $E^7$, joined to said levers and moving along rods $E^8$ and carrying said bar E'. The lever E and the parts actuated by it are all retracted by springs $E^9$, mounted on said rods $E^8$ and confined between the right-angle end pieces of the side slides and the uprights $E^{10}$, fast on the rods, and the latter are supported from the uprights A and A'.

As already stated, the purpose of the longitudinal movement of the slides is to regulate the actuation of the numeral-wheels, and to enable them to couple to the wheel-actuating mechanism they are all grooved transversely at one end of their upper surfaces, as seen at $C^8$. The wheels, which are designated by F, are provided with side pinions F', with which pinions the racks $F^2$ mesh, and the racks are severally attached to corresponding bars $F^3$, extending over the movable slides and each having a downwardly-bent end $F^4$, which enters the grooves $C^8$ in the slides, without, however, interfering with the lateral movement of the slides. Inasmuch as the bent ends $F^4$ are thus normally in engaging position with the slides, it follows that when a pin in any slide is raised and such slide is moved forward by the bar E' when the latter receives an impulse from the hand-lever E the rack whose connection $F^3$ $F^4$ happens to be in engaging position with said slide at the time will also be carried forward and cause the actuation of its corresponding numeral-wheel. The extent of this actuation is variable and depends upon the extent of the movement given the slide, and the extent of the latter is determined by the position of the pin which has been raised, the ninth pin, for instance, engaging the bar E' earlier in the movement of the latter than the eighth pin, so that the slide will receive a longer movement from the ninth pin than from the eighth pin, and so on down through the series of pins, the movement decreasing with the decrease in the power of the pin. The pinions F' are loose upon the wheel-shaft and actuate their respective wheels through the engagement of the spring-pawls $F^6$ upon the wheels with the teeth of the pinion. This construction allows rotation of the wheels independent of the pinions—such, for instance, as occurs in carrying.

At the conclusion of the sliding movement of the slides we arrange for the depressing or return of the adjusted pins to their normal positions, as follows: In the uprights $E^{10}$ a shaft $E^{11}$ is journaled, and at each end of the shaft are bell-cranks $E^{12}$, to the ends of which a plate $E^{13}$, having a notched lower edge, is pivoted. The normal position of this plate is inclined slightly toward the rear, being held in it by a spring $E^{14}$, and it is thus caused to encounter the bar E' shortly before the latter completes its operating movement. This results in swinging the plate to a vertical position, in which the projecting parts between its notches enter those of the notches $C^9$ in the slides which lie in the same transverse plane as the raised pins, thus insuring the alinement of the plate with the raised pins. The tops of the notches will now bear upon the pins, and the plate is carried down so as to force them to their normal positions by reason of the engagement of the lower arms of the bell-cranks $E^{12}$ with the stop-pins $E^{17}$, carried by the slides $E^7$. The pin-depressor plate $E^{13}$ may be thrown out of action whenever it is desired to repeat a number by throwing the lever $E^{15}$, which may be an upward extension of one of the cranks $E^{12}$, back toward the front of the machine, and it will be held in that position by a spring $E^{16}$. In this manner the plate is lifted where it cannot touch either the pins or the pusher-bar E'.

The numeral-wheels are arrested at the conclusion of each rotative movement by sliding pins $F^7$, extending horizontally from the rear of the wheels and entering peripheral notches $F^8$ on the wheels, these pins being caused to enter the notches at the conclusion of the downstroke of the hand lever-frame E by means of rods $F^9$, one at each side of the machine, having their forward ends supported loosely in eyes $F^{10}$ on the pusher-bar E' and with their points bent down to form stops adapted to engage said pusher-bar, and a cross-bar $F^{11}$, fast to said rods and extending across the rear ends of the pins $F^7$. The bar $F^{11}$ is supported and slides upon the guide-wires $F^{12}$, projecting from the rear cross-plate $A^8$, attached to the rear uprights $A^2$. In order to cushion the action of the pins $F^7$, the bar $F^{11}$ is provided with a spring-bumper $F^{13}$ opposite each of the pins. These bumpers may consist of headed pins and surrounding springs and are confined in openings in the bar, as seen at Fig. 3. With these bumpers the pins are forced against the wheels with a yielding pressure, and consequently if the notch of any wheel is not in alinement with its pin at the time the latter is actuated the pin will instantly slip into the notch as soon as the wheel has moved far enough to present the notch to it, the pin being forced to do so by the power stored up in the bumper-spring. The pins lock the wheels only momentarily, as the bar $F^{11}$ moves back away from them as soon as hand-lever E rises, and the pins are then thrown back by springs $G^{26}$, acting against the collars $G^{24}$ upon the pins. The pins $F^7$ are also brought into operation at the conclusion of the carrying movement of the wheels, as will be understood later on. They are supported in plate $A^8$ and in front of that pass through tubes $F^{14}$ and a second cross-plate $A^9$. The pawls G also engage the notches $F^8$ in the wheels and are held down upon the wheels by springs $G^2$. The movement necessary to effect the carrying is obtained as follows: The slides $E^7$ carry racks $G^3$, which engage pinions $G^4$, loose upon a cross-shaft $G^5$ and locked to the shaft by a spring-pressed pawl $G^6$, so as to operate the shaft upon the return stroke of the slides. The rack is adapted to give the shaft one complete rotation at each operation of the hand lever-frame, as will be understood from Fig. 13. The shaft $G^5$ carries a series of projecting points or pins $G^7$, one for each denomination except the first, and these points are arranged spirally around the shaft and act to successively engage corresponding cam-levers $G^8$, all pivoted on the stationary shaft $D'$ and held in normal position by springs $G^{10}$. These cam-levers at their lower ends engage longitudinally-moving rods $G^{11}$ and through them actuate centrally-pivoted levers $G^{12}$, the upper ends of which are pivotally joined to the arms $G'$, supporting the carrying-pawls. Springs $G^{13}$ act to bring levers $G^{12}$ back to their normal positions. The spiral arrangement of the pins $G^7$ causes a successive instead of a simultaneous operation of the carrying-pawls and gives each the time necessary to operate before the one of the next higher denomination is operated.

The matter of determining which of the wheels shall be operated in carrying is accomplished as follows: Each numeral-wheel is provided with a peripheral cam $G^{14}$, preferably located between figures "4" and "5," so that when the wheel stands at "9" and is moved to "0" said cam will engage the surface $G^{15}$ upon a lever $G^{16}$, stationarily pivoted laterally of said surface at $G^{17}$ to a cross-bar $A^{10}$, and swing the lower end of said lever laterally. As the lower end of the lever is forked and straddles the connecting-rod $G^{11}$, it swings the free end of the latter into position where it will be engaged by the corresponding cam-lever $G^8$, so that the wheel of the order next above the wheel whose cam has operated as above stated and corresponding to any connecting-rod which may be thus swung will be carried. The end of the rod and the lever are returned to their positions of rest as follows: The connecting-rod carries a projecting pin $G^{18}$, and when the rod is moved laterally, as above described, the pin is carried to a position at the farther side of a spring $G^{19}$, placed diagonally across the rod and having a right-angle bend at $G^{19a}$. The longitudinal movement of the rod which now takes place carries the pin into contact with the spring and compels the latter to yield to it and allow it to pass beyond it and out of contact. When this has happened, the spring moves back to its normal position, and in the return longitudinal movement of the rod the pin will now bear against the side of the spring opposite to that which it previously engaged, and this will cause the rod to move laterally to its normal position. The spring is supported at one end by a horizontal plate $A^{11}$. In order to prevent the laterally-moving levers $G^{16}$ from getting out of position, we employ devices such, for instance, as the friction-pawls $G^{20}$, pivoted at $G^{21}$ to ears upon plate $A^{12}$, and springs $G^{22}$, tending to lift the pawls. The levers ride upon the pawls, and the latter are arranged in the direction of the lateral movement of the levers, so that the latter may be always under the influence of the friction.

The arresting-pins are forced into engagement when the wheels are operated in carrying by means of wires $G^{23}$, the forward ends of which are secured around the arms $G'$ and the other ends of which are bent around the arresting-pins, collars $G^{24}$ on the pins, and coiled springs $G^{25}$, confined on the pins between the collars and the ends of the wires $G^{23}$. With this construction it will be seen that the pins will be urged forward against the wheels whenever the carrying-pawls and their arms are actuated and that the power so exerted on the pins is a yielding one, as in the case of the operation of the pins by the bar $F^{11}$.

Spring-pawls $G^{27}$ are secured in rear cross-bar $A^8$ and enter the notches in the wheels. Their purpose is to prevent any back movement of the wheels.

For purposes of subtraction and division we make the numeral-wheels reversible as to the direction of movement, and may also reverse the direction of the transverse movement of the slides carrying the setting-pins, and the means whereby we accomplish the changes in direction are as follows: $H H$ are two stationary uprights in which the shaft $F^5$ of the numeral-wheels is supported. Upon each of these uprights is a slide $H^2$, to which slides are attached a plate $H^3$ in front and a plate $H^4$ in the rear, forming, with the slides, a rectangular frame or box. In the slides are openings $H^5$, wherein eccentrics $H^6$, attached to said shaft, may be turned by power from a hand-lever $H^7$, attached to the shaft and imparting a rocking movement thereto. This lever has two positions—one shown at Fig. 2, which it occupies when the wheels move forward, as in addition, and the other indicated by broken lines at said figure, occupied when the wheels move back, as in subtraction. The lever is movable longitudinally, so as to bring the pin or screw $H^8$ at its lower end into the locking-notches $H^9$ of the arc slot $H^{10}$, and the spring $H^{11}$ is employed to lift it to bring about and retain this locking engagement. The turning of the eccentrics lifts or depresses the box or frame, according to the direction in which the eccentrics are turned, and of course lifts or depresses the parts supported in the box or frame.

The racks $F^2$ are duplicated by racks $F^{32}$, located below the numeral-wheels and preferably made in one piece with the racks $F^2$, so that both receive motion from the same connecting-bars $F^3$. The racks $F^{32}$ pass to the opposite side of their wheels, however, and mesh with pinions $F^{31}$ upon that side, these pinions being adapted to lock to the wheels by spring-pawls $F^{36}$. All the racks are guided in openings in the front and rear plates $H^3$ and $H^4$, so that when said plates are lifted by the eccentrics, that movement being imparted by the hand-lever when it is desired to reverse the motion of the wheels for subtraction, the racks $F^2$ will be lifted out of engagement with pinions $F'$ and the racks $F^{32}$ will be lifted into engagement with the pinions $F^{31}$. If the racks be now operated, the lower one will carry the wheel in the reverse direction. The plate H⁴ also acts at this same time to lift the carrying-pawls G and the spring-pawls G²⁷ out of engagement with the wheels and to bring other carrying-pawls G³⁰ and spring-pawls G⁵⁷, located below the wheels, into engagement therewith. These latter pawls are similar in all respects to the others, but by reason of their location act in the opposite direction therefrom. The pawls G³⁰ are attached to and moved by downwardly-extending arms G³¹, in one piece with or attached to the arms G' of the pawls G, so that said pawls G³⁰ are actuated by the same means that actuate pawls G. These adjustments of the numeral-wheel racks do not affect the connection between the operating-bars F³ and the slides C', a guide-plate H¹² being placed over the bars and preventing them from rising out of the grooves in the slides.

It will be understood that if it is desired to change the machine so that it will add instead of subtract the hand-lever H⁷ is moved back to its position given in full lines at Fig. 3, and this throws the reversing racks and pawls out of operation and brings the others into operative position.

To reverse the slides C', a lever J, having two positions, one at each end of the guide-slot J' in plate J², is provided, and said lever is connected to a bar J³, extending across the machine and supported upon the frame D. The bar J³ when moved to the right is carried over the foot C¹⁰ of the chain-actuating pawl C⁶ and detains the latter out of operative position, and when moved to the left it operates in the same way on a similar pawl C³⁶, located at the other side of the machine. This latter pawl when released by the bar is thrown into operative position by its spring (not shown, but similar to spring C¹¹, acting upon pawl C⁶ and shown at Fig. 12) and then acts upon the slide-chain and lifts upon it, so as to move it in a direction reversed from the movement imparted by pawl C⁶. It is pivoted to the frame D in the same manner as the pawl C⁶.

In order to compel full strokes by the main lever E, we provide a segment-rack K, a reversing double-ended pawl K', pivoted on one of the levers E⁵, tripping-points K² for reversing the pawl, and a spring K³, acting to hold the pawl in the position to which it is forced by the trips.

The operation of the machine is, briefly, as follows: If it is desired to set the machine at "125," the operator strikes the key "1," thereby setting the "1" pin in the slide lying next to the right of the denominational field, and as the key rises after the stroke the slides are moved so as to carry the set pin into the units-column. The key "2" is next struck, and this sets the "2" pin in the next slide and moves both slides over, so that the first-mentioned one will stand in the tens-column and the last-mentioned one in the units-column. The next key struck is the "5" key, and this sets the pin "5" in the third slide and also moves all the slides over, so that the first stands in the hundreds-column, the second in tens-column, and the third in units-column. If the main lever is now operated, the three lower wheels will be turned so as to represent "125." If the amount to be added is a repetition of "125," the pin-depressor plate is thrown out of operation and a second stroke given the main lever; but if the number to be added is different the depressor-plate is left in its normal position and operates to depress the slide-pins, and thus leave the machine in readiness for the setting up of other numbers. In setting the machine for other numbers the operator proceeds to strike the proper keys, as before described, and then gives a stroke to the main lever, and the sum of the numbers will then be presented by the registering devices. Other additional operations are mere repetitions in kind of these. In multiplying the operator sets the pins C to correspond to the multiplicand and then operates the main lever as many times as the unit-figure of the multiplier requires. He then shifts the slides one space and proceeds to operate the main lever as many times as is required by the tens-figure of the multiplicand, and so on. In subtracting, the number to be subtracted is set up, the reversing mechanism of the numeral-wheels being put into operation by shifting the lever H⁷, and the main lever is operated as before. In division both the lever H⁷ and the lever J are shifted, so as to reverse the motion both of the wheels and the slide-chain, and the operation is otherwise similar to that used in multiplying. To bring the wheels to zero, it is only necessary to shift lever H⁷ for subtraction and set up the pins to correspond to the number represented by the wheels and then operate the hand-lever.

While we have illustrated what we believe to be perfectly practical devices for accomplishing the various objects had in view in our machine, it will be understood that we do not wish to be limited to such devices in our claims, as obviously there are known equivalents of many of them which might be substituted therefor. We particularly do not wish to be limited to the use of numeral-wheels as the registering devices of the machine, as obviously registering-belts might be substituted, and where we use the term "wheels" in the description or claims we include the belt-register. Neither do we wish to be limited to the use of pins as the means for regulating the movements of the numeral-wheels, as obviously other devices could be substituted therefor.

Some of the parts embodied in our machine which are duplicated for every denomination may have been described without stating that fact; but it will be sufficiently evident from the description which of them are duplicated and which are not.

The slides C' are returned after they have received a sliding actuation by the engagement of the pins C²⁹, located upon their rear ends, with the rear face of the pusher-bar E'. Guides L are also placed at each side of the slide-chain and in such position relative thereto that they will prevent any sliding movement by the slides not in the denominational field.

We claim—

1. The calculating-machine consisting of a series of keys, several series of digital stops adapted to be adjusted in their operative positions by said keys, means for moving said stops a denominational space at each operation of the keys, means controlled by said stops for actuating the wheels, and said wheels, substantially as specified.

2. The calculating-machine, consisting of digital keys, a series of numeral-wheels, a series of devices for controlling and operating the wheels, such devices being movable by the keys across the denominational field to bring them successively into operative relation with the wheels, and each of them being provided with means for determining when the wheel with which it is in operative relation shall be operated and the extent of the operation, and means for actuating said devices in thus operating the wheels, substantially as specified.

3. The calculating-machine, consisting of digital keys, a series of numeral-wheels, a series of devices for controlling and operating the wheels, such devices being movable from denomination to denomination at each actuation of the keys to bring them successively into operative relation with the wheels to be operated, and each of said devices being provided with means for determining when the wheel with which it is in operative relation shall be operated and the extent of the operation, and means for actuating all said devices simultaneously in thus operating the wheels, substantially as specified.

4. The calculating-machine comprising the following elements in combination: first, a keyboard of nine digital keys; second, a series of slides, each containing nine stops adapted to be set by the keys, and arranged to feed over a denominational space; third, a series of denominational wheels or registers whose movements are determined by said stops, and fourth, means for actuating said wheels, substantially as specified.

5. In a calculating-machine, the combination with a single series of digital keys, of a series of movable slides carrying stops or pins adapted to be set in operative position by the keys, means for moving the series of slides across the denominational field of the machine a single denominational space at each impulse, a series of numeral-registers one for each denomination, means for operating said numeral-registers adapted to be connected to said slides, and means for operating the slides whose stops have been set, substantially as specified.

6. The calculating-machine wherein are combined a set of nine keys, one for each digit, a series of numeral-wheels one for each denomination, a transversely-moving series of slides each provided with nine adjustable stops and each movable independently in a longitudinal direction, means whereby the keys set said stops, means whereby the keys move the series of slides transversely, mechanical connections between said slides and the wheels, and a bar movable over the series of slides and engaging the stops which have been set, substantially as specified.

7. The combination with the numeral-wheels and keys of a calculating-machine, of a series of slides one for each denomination, each carrying stops adapted to be set by the keys, and each mechanically connected to the corresponding wheels so as to operate the latter, and a hand-operated device engaging the set stops and moving the slides to the extent determined by the position thereon of set stops, substantially as specified.

8. The combination with the keys, of several series of adjustable digital stops all movable over a common setting-point, and levers operated by the keys and acting to adjust the stops when the latter are positioned at the setting-point, substantially as specified.

9. The combination with the keys, of several series of stops all adjustable by power from the keys and all movable step by step, in one of the pauses of which movement they are positioned over a common setting-point, and levers operated by the keys and acting to adjust the stops when they are located at said setting-point, substantially as specified.

10. The combination with the keys, of several series of adjustable digital stops all movable over a common setting-point, means whereby the keys may adjust said stops when the latter are positioned at said setting-point, means whereby the keys may also move the several series over said point, and numeral-wheels whose movements are controlled by said stops, substantially as specified.

11. The combination in a calculating-machine, with the adjustable stops C, of means for adjusting said stops and means for depressing them, substantially as specified.

12. The calculating-machine consisting of a series of keys, several series of digital stops adapted to be adjusted in their operative positions by said keys, means for moving said stops a denominational space at each operation of the keys, means controlled by said stops for actuating the wheels, said wheels, and means for returning the stops to their normal position, substantially as specified.

13. The combination in a calculating-machine, with the adjustable stops C, of the pusher-bar E' and a device for depressing said stops positioned over the stops by said pusher-bar, substantially as specified.

14. The combination with the adjustable stops of slides carrying said stops and notched as at C⁹, and a notched plate engaging said notches in the slides and acting to depress the stops, substantially as specified.

15. The combination with the adjustable stops of slides carrying said stops and notched as at C⁹, the pusher-bar E' and a notched plate positioned by the pusher-bar and engaging said notches in the slides and acting to depress the stops, substantially as specified.

16. The calculating-machine consisting of a series of keys, several series of digital stops adapted to be adjusted in their operative positions by said keys, means for moving said stops a denominational space at each operation of the keys, means controlled by said stops for actuating the wheels, said wheels, and means for returning the stops to their normal position, said returning means being also adapted to be thrown out of operation at will, substantially as specified.

17. The combination with the keys and numeral-wheels, of a series of slides each carrying digital stops, rods upon which said slides are movably supported, means for adjusting the stops and means for moving the slides along the rods, substantially as specified.

18. The combination with the keys and numeral-wheels of a calculating-machine, of an endless series of devices carrying stops for controlling the movements of the wheels, and means for moving said devices across the denominational field of the machine, substantially as specified.

19. In a calculating-machine, the series of slides in combination with the rods supporting and forming ways for said slides, and links uniting the rods, substantially as specified.

20. In a calculating-machine, the series of slides in combination with the rods supporting and forming ways for said slides, links uniting the rods in an endless chain, sprocket-wheels meshing with the rods, and means for operating the chain, substantially as specified.

21. In a calculating-machine, the series of slides in combination with the rods supporting and forming ways for said slides, links uniting the rods in an endless chain, sprocket-wheels meshing with the rods, means for operating the chain, the keys actuating said operating means, and denominational wheels to whose spaces the slides are carried by the movement of the chain, substantially as specified.

22. The combination with numeral-wheels having peripheral notches, of pins for arresting the wheels, a bar passing across the series of pins and provided with a spring-bumper opposite each pin, and means for actuating said bar, substantially as specified.

23. The combination with the numeral-wheels, of duplicate pinions for each wheel, pawls for locking the pinions to their corresponding numeral-wheels, a separate rack for each pinion, means for throwing either series of racks into operation at will, and a series of slides movable across the denominational field and engaging the racks, and also capable of a sliding movement in which they operate said racks, substantially as specified.

24. The combination with the numeral-wheels of duplicate carrying-pawls acting thereon in opposite directions, and means for shifting said pawls at will to bring one set into and throw the other out of operation, substantially as specified.

25. The combination with the numeral-wheels of duplicate actuating devices and duplicate carrying devices adapted to rotate the wheels in opposite directions, and means for shifting the same to bring one set into operation and to throw the other set out of operation, substantially as specified.

26. The combination with the numeral-wheels, of the duplicate series of operating-racks, the guide-plates H³ and H⁴, supported from the numeral-wheel shaft, and means for raising and lowering said plates, substantially as specified.

27. The combination with the numeral-wheels, of the duplicate series of operating-racks, the guide-plates H³ and H⁴, and the eccentrics and hand-lever for raising and lowering said plates, substantially as specified.

28. The combination with the numeral-wheels and duplicate carrying-pawls for each wheel, either of which can be used at will, of a shaft having spirally-arranged pins adapted to operate successively a series of levers corresponding to the wheels, mechanical connections between the pawls and said levers, and means for imparting a sufficient amount of rotation to said shaft to operate all the levers at each actuation, substantially as specified.

29. The combination with the numeral-wheels, of a series of carrying-pawls for carrying the wheels in addition, another series of pawls for carrying the wheels in a reverse direction as in subtraction, and means other than the numeral-wheels for actuating either series of said pawls in succession one after another, substantially as specified.

30. The combination with the series of stop-carrying slides, of duplicate devices adapted to move the same in opposite directions, and means controlling said devices and whereby either device may be put into operation while the other is kept out of operation, substantially as specified.

31. The combination with the series of stop-carrying slides, of duplicate devices adapted to move the same in opposite directions and also adapted to be used in alternation, substantially as specified.

32. The calculating-machine having a series of stops movable across the denominational field and acting to control the actuations of the registering devices, and means for reversing the direction in which the stops move, substantially as specified.

33. The calculating-machine wherein are combined a series of registers adapted to be moved in either direction according to the nature of the calculation being made, means for actuating said registers, and a series of controlling devices movable both transversely and longitudinally of the machine, the transverse movement serving to position the controlling devices and the longitudinal movement serving to operate said register-actuating devices, substantially as specified.

34. The combination with the numeral-wheels and carrying-pawls, of the cams on the wheels, the connecting-rods $G^{11}$, the levers actuated by said cams and acting to shift the connecting-rods $G^{11}$ into operative position, means for actuating said rods, and means for carrying motion from said rods to the pawls, substantially as specified.

35. The combination with the numeral-wheels and carrying-pawls, of the cams on the wheels, the levers actuated by said cams and acting to shift the connecting-rods $G^{11}$ into operative position, said rods, the springs and pins for shifting the rods back to their normal position, means for actuating said rods, and means for carrying motion from said rods to the pawls, substantially as specified.

36. The combination with the peripherally-notched register-wheels, the hand-lever giving the power for actuating the wheels, of arresting-pins $F^7$ and means whereby said pins are moved into operative position at the close of the downstroke of said lever, substantially as specified.

37. The combination with the peripherally-notched register-wheels, of the arresting-pins $F^7$, means for carrying said pins into operative position, and springs whereby the contact of the pins with the wheels is made yielding, substantially as specified.

GEO. B. PETERS.
EDWIN R. PETERS.

Witnesses:
T. B. WILSON,
J. G. EASTIN.